Oct. 11, 1955  P. W. POLENZ  2,720,184
ARTICULATED AND SELF-LOCKING SHANK FOR AN ANCHOR
Filed March 29, 1954

INVENTOR.
PAUL W. POLENZ
BY Knox & Knox
Agents

2,720,184

ARTICULATED AND SELF-LOCKING SHANK FOR AN ANCHOR

Paul W. Polenz, San Diego, Calif.

Application March 29, 1954, Serial No. 419,354

2 Claims. (Cl. 114—208)

The present invention relates generally to sea anchors and more particularly to an articulated and self-locking shank for an anchor.

The primary object of this invention is to provide an anchor shank having a self-contained articulated and locking mechanism, by which the shank may be locked in longitudinal alignment to exert pull in the general direction in which the flukes point, when burying the anchor, the shank being capable of being unlocked and pivoted to the required position to exert a pulling force having a minimized lifting or rotative component and a large component in the opposite direction for freeing the anchor.

Another object of this invention is to provide an anchor shank which is automatic in operation and is controlled by the direction of pull on the anchor chain.

Another object of this invention is to provide an articulated shank which is particularly suitable for use with a pivoted fluke type anchor.

Another object of this invention is to provide an anchor shank which is inexpensive and practicable to manufacture.

Finally, it is an object to provide an anchor shank of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Figure 1:
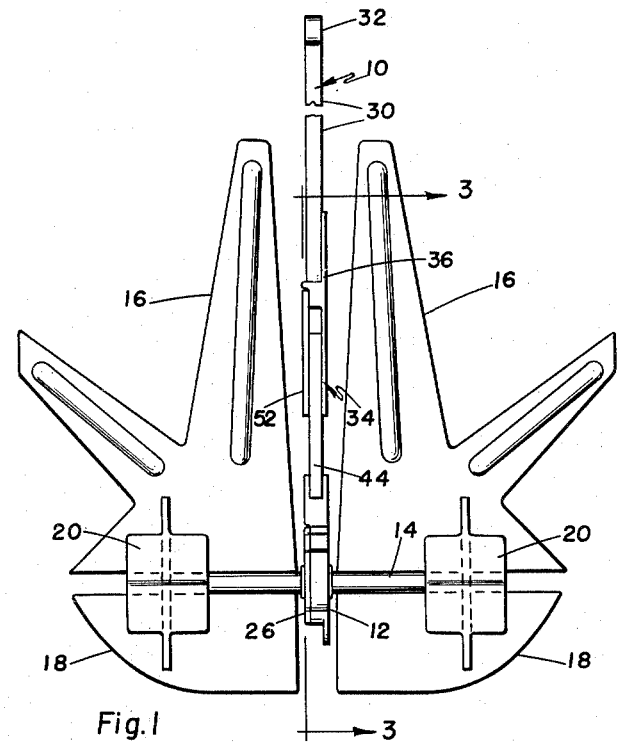
Fig. 1 is a plan view of a pivoted fluke anchor having the articulated shank.
Figure 2:
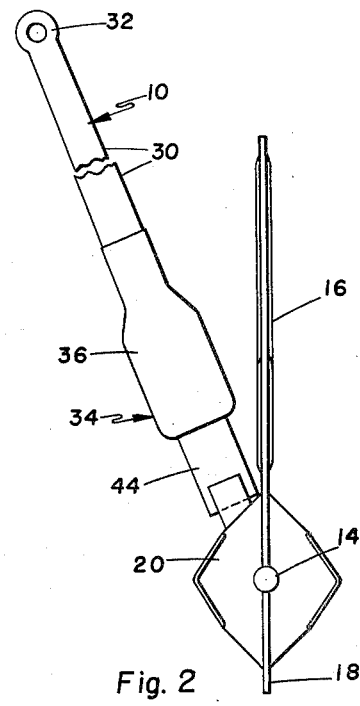
Fig. 2 is a side elevation view of the anchor showing the shank in maximum angular offset position relative to the pivoted flukes.

This patent is primarily concerned with a novel articulated and locking shank which may be used with various anchors, particularly those of the pivoted fluke type. For purposes of description, a particular pivoted fluke anchor is shown and described, but the shank should not be considered as limited to this anchor, the structure of which is similar to that disclosed in my co-pending application, Serial Number 419,149, filed March 29, 1954.

Referring now to the drawing and in particular to Figs. 1–4, the anchor comprises the novel shank 10 having a hub 12, in which is rotatably mounted a transverse shaft 14 extending on both sides of said hub. Secured to the extending portions of the shaft 14 are flukes 16—16 and opposed sub-flukes 18—18. Secured to the flukes 16—16, the sub-flukes 18—18 and the shaft 14 are crowns 20—20, spaced on each side of the shank 10. The hub 12 has a cavity 22 which contains a cam 24, said cam being secured to the shaft 14 and shaped so that the rotation of the shaft is limited, thus allowing the flukes 16—16 to pivot to fixed angular positions above or below the shank 10. The cavity 22 is enclosed by a cover plate 26 secured to the hub 12 by screws 28.

The shank 10 comprises a shank portion or stem 30 having at one end an eye 32 for attachment to an anchor chain or the like. At the other end of the stem 30 is an articulated joint 34, comprising a support plate 36 secured to said stem and having thereon a projecting key block 38. The support plate 36 has an end block 40 abutting the end of the stem 30, said end block having a shoulder 42. Mounted on the support plate 36 is a shank portion or stub arm 44 having therein a keyhole slot 46, which comprises a substantially circular opening 48 and a rectangular notch 50 extending radially therefrom. The keyhole slot 46 is shaped so that the key block 38 fits closely in the notch 50 and is freely rotatable in the circular opening 48. The stub arm 44 is retained by a cover plate 52 resting on the shoulder 42 and the key block 38 and secured thereto substantially parallel to the support plate 36 by screws 54. The free end of the stub arm 44 is attached securely to the hub 12.

Figure 3:
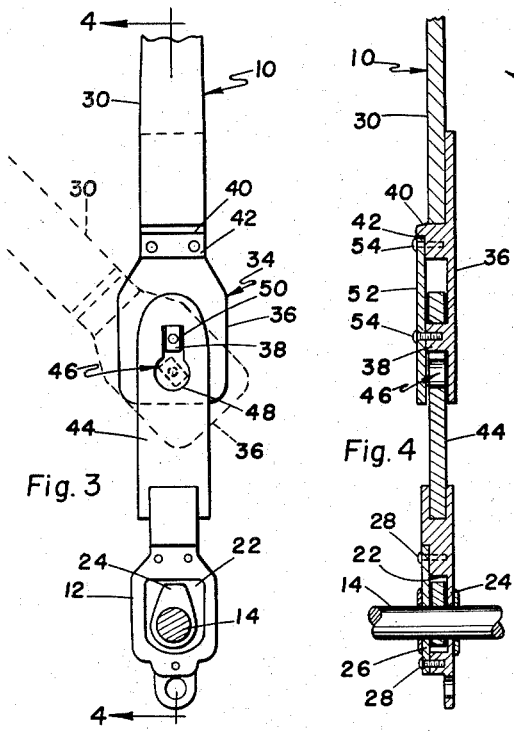
Fig. 3 is an enlarged sectional view taken on the line 3—3 of Fig. 1, the cover plates being removed to show the mechanism therein.
Figure 4:
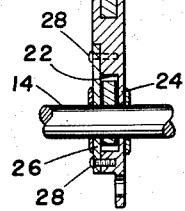
Fig. 4 is a sectional view taken on the line 4—4 of Fig. 3.
Figure 5:
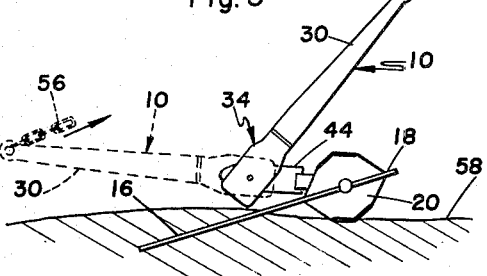
Fig. 5 is a diagrammatic view of the anchor in buried position in the sea bed.

With particular reference to Fig. 3, it will be seen that when the key block 38 is in the notch 50, the shank portion or stub arm 44 is locked in longitudinal alignment with the shank portion or stem 30. By shifting the stem 30 longitudinally the key block 38 is brought into the circular opening 48 allowing said stem to pivot freely as shown in dotted line. Thus by subjecting the stem 30 to a linear force in the general direction in which the flukes point, the shank portions are locked firmly in longitudinal alignment. When the anchor is lowered to the sea bed, the flukes 16—16 become partially buried. Linear pull on the shank 10 through the anchor chain 56, as shown in Fig. 5, locks the shank portions together and causes the flukes to be pulled deeper into the sea bed indicated at 58.

By subjecting the stem 30 to a linear force in the opposite general direction or towards the hub 12, the shank portions first unlock and then hinge. It will be evident, as illustrated in Fig. 6, that when the stem 30 is in the ful line position of Fig. 6, that the pulling force component tending to rotate the anchor about the shaft 14 is reduced since the effective length of the lever arm or shank is shortened while the component parallel to the flukes and tending to withdraw the anchor is increased so that the anchor will never become irremovably lodged.

Figure 6:
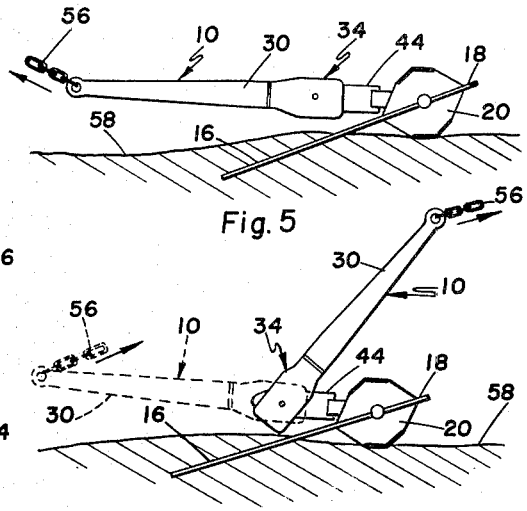
Fig. 6 is a diagrammatic view of the anchor in the process of being released from the sea bed.

In other words, to release the anchor, the pull on the anchor chain 56 is reversed, as shown in dotted line in Fig. 6, this causing the articulated joint 34 to unlock allowing the shank portion or stem 30 to pivot as shown in full line. Continued pull thus releases the flukes 16—16 from the sea bed. It should be noted that with the articulated shank in folded position, the releasing pull is effective through the pivot point of the articulated joint 34. This pivot point is relatively close to the shaft 14 so that very little torque is applied to the shaft, with the result that the flukes 16—16 are withdrawn without binding. If the shank 10 were not articulated, the excessive torque caused by withdrawing the anchor in this manner would cause the flukes to bind in the sea bed and place undue strain on the anchor structure and hoisting gear.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. An articulated and locking shank for an anchor, comprising a stem, a stub arm, a hinge joint connecting said stem and stub arm, said joint including a support plate secured to said stem and a key block fixed to said plate, said stub arm being pivotally mounted on said support plate to pivot about said key block, said stub arm having an elongated notch having the elongation of said notch axially aligned with the stub arm and shaped to receive said key block when said stem is axially aligned with said stub arm and shifted longitudinally relative to the stub arm, whereby said stub arm is locked in fixed axial alignment with said stem.

2. An articulated and locking shank for an anchor, comprising a stem, a stub arm, a hinge joint connecting said stem and stub arm, said joint including a key block fixed to said stem, said stub arm having a keyhole slot comprising a circular opening freely pivotal around said key block and a notch extending from said circular opening and lying along the axis of the stub arm, said notch being shaped to receive said key block when said stem is axially aligned with said stub arm and shifted longitudinally in one direction relative to said stub arm, whereby said stub arm is locked in fixed axial alignment with said stem when the shank is under longitudinal tension.

References Cited in the file of this patent

UNITED STATES PATENTS

| | | |
|---|---|---|
| 594,769 | Ward | Nov. 30, 1897 |
| 2,007,667 | Stubbs | July 9, 1935 |
| 2,630,774 | Polenz | Mar. 10, 1953 |
| 2,641,216 | Dial | June 9, 1953 |